United States Patent [19]

Minami et al.

[11] Patent Number: 4,666,605
[45] Date of Patent: May 19, 1987

[54] METHANE FERMENTATION PROCESS FOR TREATING EVAPORATOR CONDENSATE FROM PULP MAKING SYSTEM

[75] Inventors: Kiyoshi Minami; Tsuyoshi Horiyama, both of Tokyo, Japan

[73] Assignee: Shimizu Construction Co., Ltd., Tokyo, Japan

[21] Appl. No.: 788,235

[22] Filed: Oct. 17, 1985

[30] Foreign Application Priority Data

Feb. 23, 1985 [JP] Japan .................................. 60-35056

[51] Int. Cl.[4] ............................. C02F 3/28; C12P 5/02
[52] U.S. Cl. .................................... 210/603; 210/617; 210/928; 435/167; 48/197 A
[58] Field of Search ............... 210/603, 617, 928, 631, 210/218; 48/197 A; 435/167

[56] References Cited

U.S. PATENT DOCUMENTS

| | | | |
|---|---|---|---|
| 4,213,857 | 7/1980 | Ishida et al. | 210/603 |
| 4,297,216 | 10/1981 | Ishida et al. | 210/603 |
| 4,514,501 | 4/1985 | Kita et al. | 210/928 |
| 4,551,250 | 11/1985 | Morper et al. | 210/603 |

FOREIGN PATENT DOCUMENTS 58-81492  5/1983  Japan .................................. 210/603

OTHER PUBLICATIONS

Frostell B. et al., "Full Scale Anaerobic Treatment of a Pulp and Paper Industry Wastewater"; Proc. of the 39th Ind. Waste Conf. Purdue Univ.; pp. 687–696; (1984).

Primary Examiner—Benoit Castel
Attorney, Agent, or Firm—Hoffmann, Dilworth, Barrese & Baron

[57] ABSTRACT

A methane fermentation process for processing an evaporator condensate of a waste fluid from a pulp production system is disclosed. The process comprises the pre-treatment step of adding an acid into the evaporator condensate to settle and coagulate inhibitors for methane fermentation, removing the inhibitors, and thereafter neutralizing the waste fluid deprived of the inhibitors; and the fermentation step of allowing the effluent from the pre-treatment step to flow through a methane fermentation bio-reactor where the effluent undergoes fermentation to generate methane.

2 Claims, 6 Drawing Figures

METHANE FERMENTATION PROCESS FOR TREATING EVAPORATOR CONDENSATE FROM PULP MAKING SYSTEM

BACKGROUND OF THE INVENTION

1. Field of Art

The present invention relates generally to a process for the treatment of waste fluids, and more particularly to a process for treating the waste discharged from paper making factories in an enormous quantity in a manner such that the organic substances contained in the waste are fermented efficiently to generate methane which may be used as an economical resource.

Kraft pulps are predominantly prepared and used in the paper making industry. Particularly in Japan, the share of the kraft pulps reaches more than 70% of the total yield of pulps. In order to prepare 1 ton of kraft pulp, about 2 tons of wooden material and about 0.5 tons of an alkali are put into a pulping kettle or pulper with a large volume of water. In this pulp making step, materials other than cellulose are dissolved in water to form the so-called black liquor or cooked liquor, the main ingredient of the black liquor being lignin. The black liquor is concentrated by evaporating water in a boiler so that the alkali and alkali compounds are recovered so as not to cause pollution problem due to contamination thereby. The liquid extracted from the black liquor at the evaporation step is commonly referred to as evaporator condensate. The amount of the evaporator condensate discharged from the paper or pulp making factory is so large that a factory having a capacity of producing pulp of 1000 tons/day, for example, discharges the evaporator condensate in an amount of about 6000 to 7000 tons/day. Under these circumstances, it becomes an important problem to treat the waste in a manner such that the profitable materials contained therein is converted into useful substances of some form and water can be reused in the pulp making step.

2. Statements of Related Art

Up to date, the waste from the pulp making step containing several thousand ppm of organic materials has been processed through the activated sludge process together with other wastes. However, the concentration of organic materials contained therein is generally too high to be conveniently processed through the activated sludge process; while the concentration of organic materials adapted for successful processing by the activated sludge process is not less than about 1000 ppm, that in the waste from the pulp making system ranges, in general, from 3000 to 8000 ppm. It has been, therefore, necessitated either to dilute the waste to lower the concentration of organic materials contained therein or the residence time of such waste in the processing tank or vessel must be prolonged, leading to enormous increase in cost.

On the other hand, if the waste can be used as a raw material for a methane fermentation system, the concentration of organic materials in a raw material required for such fermentation being normally about 20,000 ppm or more, the waste may be used as an energy source in addition to the advantageous result that the loading on the conventional activated sludge process can be reduced, whereby favourite economical interests including saving of natural resources and saving of energy are attainable. With such the object in view, it has been eagerly investigated to develop a methane fermentation process using a bio-reactor in recent years. However, there has not yet been developed a satisfactory methane fermentation process for the treatment of the waste from the pulp making system, to the best of our knowledge.

Although it is not intended to be bound to any theory or hypothesis, it is considered that the content of organic materials contained in such a waste, 3000 to 8000 ppm as aforementioned, is lower than that suited for methane fermentation, and that a large amount of sulfur compounds which are recognized as inhibitors for anaerobic fermentation is contained therein to inhibit or hinder continuous and stable methane fermentation.

OBJECTS AND SUMMARY OF THE INVENTION

Accordingly, a primary object of this invention is to provide a process wherein a waste from a pulp making system (the waste being referred to simply as "pulp waste" hereinafter in the specification and some of the appended claims) containing organic materials in a content which is somewhat lower than that conveniently used for a raw material in the conventional methane fermentation process can be processed to generate methane readily.

A more specific object of this invention is to provide a process including a pre-treatment step for removing inhibitors which inhibit or hinder the subsequent methane fermentation step.

Another object of this invention is to provide such a process wherein inhibitors for subsequent methane fermentation step are removed by the addition of an acid to the pulp waste to bring the pH value thereof to pH 3 or lower thereby to precipitate the lignin-base materials entrained in the pulp waste during the evaporation step and serving as surface active agents.

A further object of this invention is to provide a process for treating the pulp waste whereby the organic materials contained therein are converted into methane which can be used as useful energy source.

A still further object of this invention is to provide a process for treating the pulp waste whereby the water recovered from the waste may be returned back to the pulp making step for re-use.

Yet a further object of this invention is to provide a process for treating the pulp waste, which can be operated at low cost in a small size processing facility.

A further object of this invention is to provide a process for treating the pulp waste wherein the stripping step for the removal of undesirable sulfur-origin odor can be omitted to simplify the overall procedure otherwise necessary in the prior art pulp waste processing methods.

The present invention has been accomplished in view of the findings found in our eager pursuit for developing a novel process for enabling methane fermentation by the use of the pulp waste as the raw or starting material, the course of our investigation will be described hereinbelow for better understanding of this invention.

Initially, in the analysis of the properties and composition of the pulp waste, it has been found that there are present oily materials having low specific gravities, other than sulfur compounds, which hinder methane fermentation. In detail, the pulp waste contains, other than methanol which is a decomposition product of lignin, oily materials having wood-like odor and extracted by distillation, lignin-base materials entrained during the evaporation step and the sulfur compounds, such as methyl mercaptan, dimethyl sulfide and dimethyl disulfide, the presence of the last mentioned sulfur compound being pointed out as those acting as inhibitors for methane fermentation. All of these materials form an emulsion or are partly dissolved in water under the surface active actions of the lignin-base materials entrained in the pulp waste. When the pH value of the pulp waste is lowered to, for instance, pH 3 or lower, the lignin-base materials are sedimented and coagulated so that the aforementioned oily materials and a portion of sulfur compounds are precipitated while being coagulated with or confined in the sedimented lignin-base materials as the lignin-base materials are sedimented, resulting in reduction of surface activity of the waste liquid. This mixed precipitate or coagulation sediment may be formed at a relatively high temperature of 80° C., and may be easily removed by ordinary filtration. As a result, the content of inhibitors for methane fermentation can be reduced appreciably by once acidifying the pulp waste, whereby a raw material for successful methane fermentation having a relatively high content of organic materials can be prepared from a pulp waste.

The present invention resides broadly in the methane fermentation process for processing an evaporator condensate of a waste fluid from a pulp production system, comprising:

(a) the pre-treatment step of adding an acid into the evaporator condensate to settle and coagulate inhibitors for methane fermentation, removing the inhibitors, and thereafter neutralizing the waste fluid deprived of the inhibitors; and (b) the fermentation step of allowing the effluent from the pre-treatment step to flow through a methane fermentation bio-reactor where the effluent undergoes fermentation to generate methane.

Since inhibitors for methane fermentation has been removed in the preceding pre-treatment step, according to the invention, by the acidification or pH adjustment followed by filtration, the methane fermentation reaction can immediately take place without being obstructed by the disadvantageous actions thereby.

In a preferred embodiment of the invention, the fermentation step is carried out in a bio-reactor charged with lumps or granules of a porous fire-resisting stone or rock such as a pumice. By the use of such a porous fire-resisting stone, symbiosis, growth and adherence of bacteria participating in the fermentation reaction are enhanced by the favourite action of the packed porous fire-resisting stone, the methane fermentation reaction rate can be increased so that the pulp waste containing relatively low content of fermentative organic materials can be readily treated economically within a short period of time, for example, within a time period of shorter than one day. This is a remarkable improvement over the prior art process in which the pulp waste must be treated over a residence time of 10 to 30 days due to low concentration of the organic materials and microorganisms.

BRIEF DESCRIPTION OF THE DRAWINGS

The present invention will now be described in detail with reference to the appended drawings, wherein.

EXAMPLES OF THE INVENTION

The present invention will now be described by referring to preferred examples thereof. However, it is noted hereby that the following examples are given by way of example only, and that the present invention should not be limited to the following example in any sense, the invention being defined only by the appended claims.

EXAMPLE 1

(i) 200 ml for each of a pulp waste having a pH value of 10.5 and a BOD5 of 3800 ppm, and containing 0.24 wt % of methanol, 15 mg/l of SS and 380 ppm of sulfur compounds was put into a 200 ml volume measuring flask. Respective pulp wastes contained in measuring flasks were added with concentrated hydrochloric acid to adjust the pH values thereof to one of the seven stage pH values ranging within pH 2.0 to pH 8.0 as set forth in Table 1. The sedimentation of solid substances of each sample was observed. The results are shown in Table 1.

TABLE 1

| pH Value | 2.0 | 3.0 | 4.0 | 5.0 | 6.0 | 7.0 | 8.0 |
|---|---|---|---|---|---|---|---|
| Sedimentation of Solids | ++ | ++ | − | − | − | − | − |

As will be apparent from Table 1, solids were sedimented from the pulp waste when the pH value thereof was adjusted to not higher than 3.0. It was necessary to add 0.61 ml of conc. hydrochloric acid to 1 l of the pulp waste in order to adjust the pH value thereof to pH 3. The following Table 2 shows the quantities of other acids required for adjusting pH value of the same pulp waste below pH 3.0.

TABLE 2

| Acid | 35% conc. HCl | 98% conc. $H_2SO_4$ | 67.5% conc. $HNO_3$ | 80% HCOOH |
|---|---|---|---|---|
| Volume (ml) of Acid Required for Sedimentation of Solids | 0.61 | 0.15 | 0.47 | 1.0 |

(ii) The pulp waste previously added with 0.61 ml/l of the aforementioned concentrated hydrochloric acid was then added with 1 g of a filter aid (produced by Johns-Manville Sales Corp.) under agitation, and filtered through a No. 2 filter paper. The properties of the filtrate were as follows:

pH Value: 3.0.
Content of Methanol: 0.24 wt %.
BOD5: 3150 ppm.
SS: 0 mg.
Content of Sulfur Compounds: 100 ppm.

The filtrate will be referred to hereinafter as "filtrate after acidification".

(iii) Separately, a bio-reactor packed with a porous fire-resisting stone was prepared in the following manner. Into a wide mouth glass bottle (2 l capacity) provided with a lid and packed with 1 l of a crushed porous fire-resisting stone, charged was 1 l of a high temperature methane fermentation waste picked out of a facility for processing a waste from a food production process. The content in the glass bottle had been maintained at 53° C., and 300 ml of the cultivated liquid was removed from the bottle at every 5 day intervals and 300 ml of a culture medium, the composition of which is set forth in the following Table 3, was added into the bottle in place of the removed cultivated liquid, so that the bacteria participating in the methane fermentation reaction was acclimatized to methanol for 50 days. The bio-reactor packed with the crushed porous fire-resisting stone on which the acclimatized methane fermentation bacteria were adhering and living in symbiosis was, thus, prepared.

TABLE 3

| Methanol | 6.3 g |
|---|---|
| $(NH_4)_2SO_4$ | 0.7 g |
| $K_2HPO_4$ | 0.1 g |
| $KH_2PO_4$ | 0.1 g |
| $MgSO_4.7H_2O$ | 0.1 g |
| Yeast Extract | 0.1 g |
| City Water | 1 l |

Figure 1:
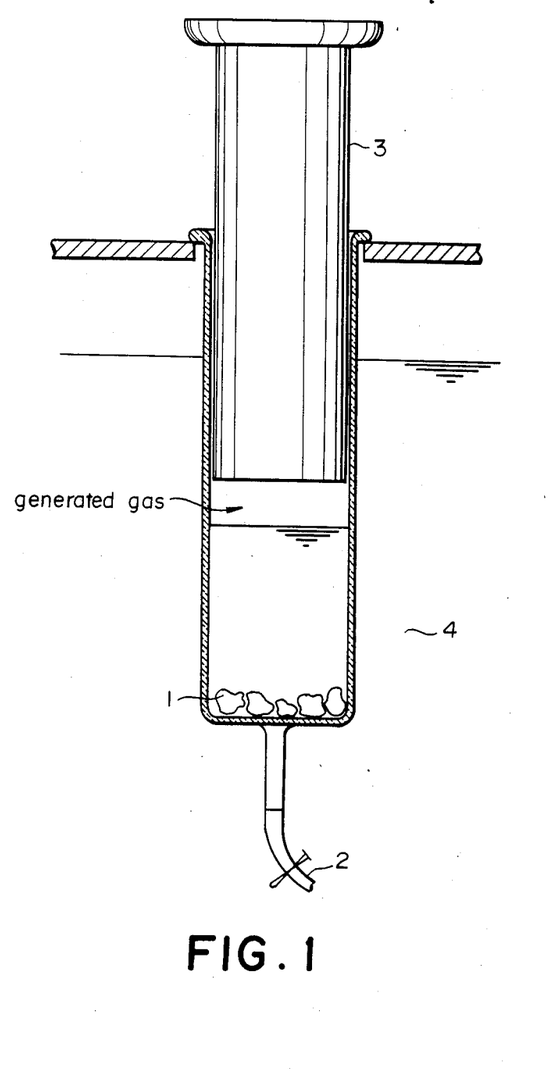
FIG. 1 shows a diagrammatical section of an apparatus used in an experiment for confirming the methane fermentation efficiency according to the invention.
Figure 2:
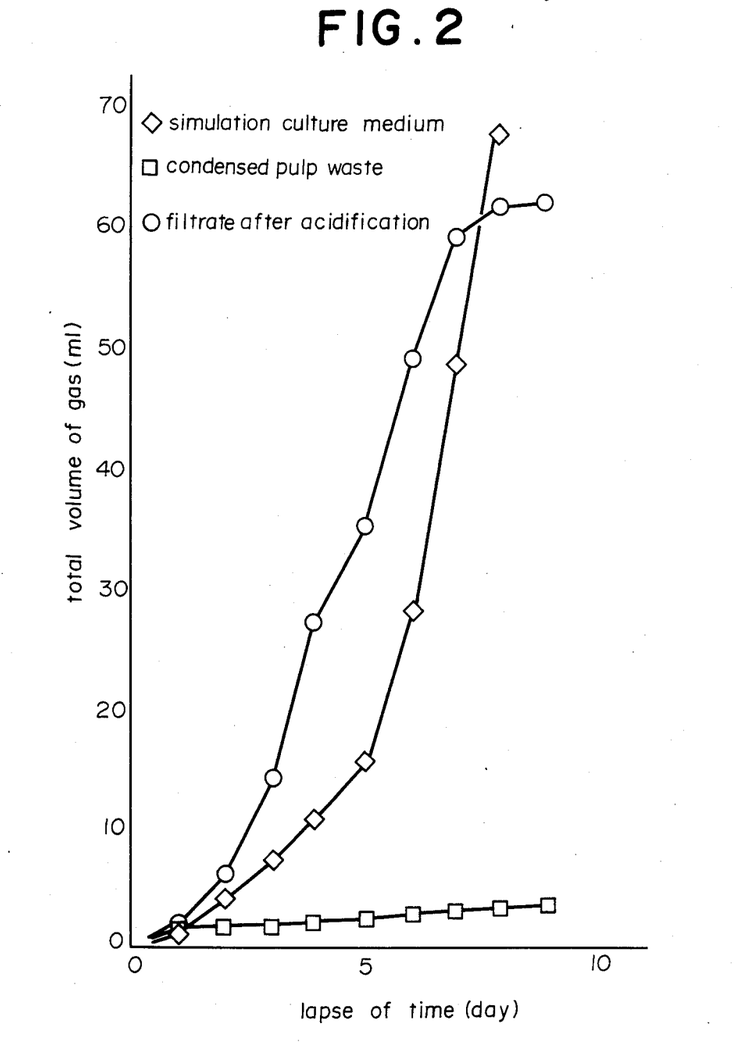
FIG. 2 is a graph showing the volume of gases generated by the methane fermentation process conducted by using the apparatus shown in FIG. 1 in terms of the lapse in fermentation or cultivation time.

5 g for each of the wet crushed porous fire-resisting stone particles 1, prepared as aforementioned, were packed in a 100 ml injection syringe 3 attached with a Tygon (polyvinyl-chloride produced and sold by Stoneware Co.) tube 2 which could be sealingly closed, as shown in FIG. 1. A first injection syringe was charged with 40 ml of the pulp waste added with a predetermined quantity of a composition including the ingredients of the aforementioned culture medium composition as set forth in Table 3 except that methanol and city water were omitted. A separate second injection syringe was charged with 40 ml of the "filtrate after acidification" prepared by the preceding step (ii) and having a pH value of 7.4; and then added with the same quantity of same composition as contained in the first injection syringe. A separate third injection syringe was charged with 400 ml of the culture medium having the composition as set forth in Table 3. After expelling air in the syringes, those syringes were placed in a constant temperature bath 14 maintained at 53° C., and the volumes of gases generated in respective tubes were measured. The results, i.e. the total volume of gases generated in each of the syringe tubes as the lapse of time are shown in FIG. 2. The result showed that the pulp waste did not generate methane gas. It was shown that gases were generated normally in the tube or syringe charged with the "filtrate after acidification" for 8 days after the initiation of fermentation, and that generation of gases was stopped at the ninth day. The content of methanol in the "filtrate after acidification" was 0.24 wt %, which corresponded to 91% of the theoretical yield.

EXAMPLE 2

Figure 3:
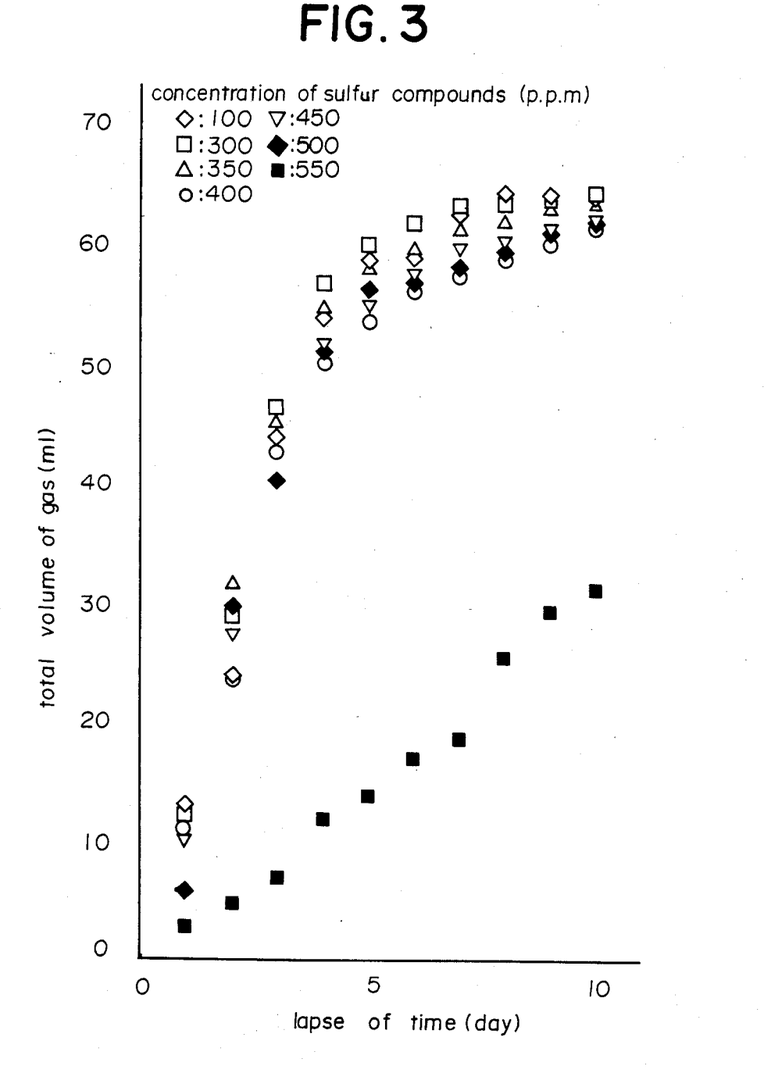
FIG. 3 is a graph showing the volume of gases generated by the methane fermentation process conducted by using the apparatus shown in FIG. 1 in terms of the lapse of fermentation or cultivation time, while using starting materials prepared by adding the waste pulp once pre-treated through the pre-treating step of the invention with sulfur compounds in order to learn the affects of added sulfur compounds on the methane fermentation reaction.

The "filtrate after acidification" prepared in accordance with the step (ii) of Example 1 was added with the ingredients contained in the culture medium of Table 3 except that methanol and water were omitted, the mixing ratio of the ingredients being the same as in the composition of Table 3, and then the pH value of the admixture was adjusted to 7.4; thereafter equivalent amounts of methyl mercaptan, dimethyl sulfide and dimethyl thiosulphate were added to prepare seven sample liquors containing, respectively, 100, 200, 350, 400, 450, 500 and 550 ppm of total sulfur compounds. 40 ml of each of the sample liquors was put into an injection syringe, similarly as in step (iii) of Example 1, and placed in a constant temperature bath maintained at 53° C. The volumes of gases generated in respective syringe tubes were measured. The results are shown by the graph of FIG. 3. It should be appreciated from the results shown in FIG. 3 that no hindrance to gas generation were observed when up to 500 ppm of total sulfur compounds were contained, showing that generation of methane and growth of bacteria participating in methane fermentation were not hindered or inhibited by the sulfur compounds, although inhibition to generation of gases was observed at some extent in case where the total sulfur compound content was set to 550 ppm.

EXAMPLE 3

In order to confirm that the "filtrate after acidification" can be used in a continuous methane fermentation process of industrial scale, the following experiments have been conducted. Using an empirical apparatus for continuous methane fermentation shown in FIG. 4, methane fermentation had been continued for about 2 months on a methanol simulation culture medium (composed of 6.3 g of $(NH_4)_2SO_4$, 0.7 g of $K_2HPO_4$, 0.4 g of $KH_2PO_4$, 0.1 g of $MgSO_4.7H_2O$ and 0.1 g of yeast extract dissolved in city water) under the condition of HRT=2 days (Dilution Rate: 0.5/day). Thereafter, the "filtrate after acidification" and the pulp waste fluid were directly introduced in the apparatuses to effect continuous methane fermentation.

Figure 4:
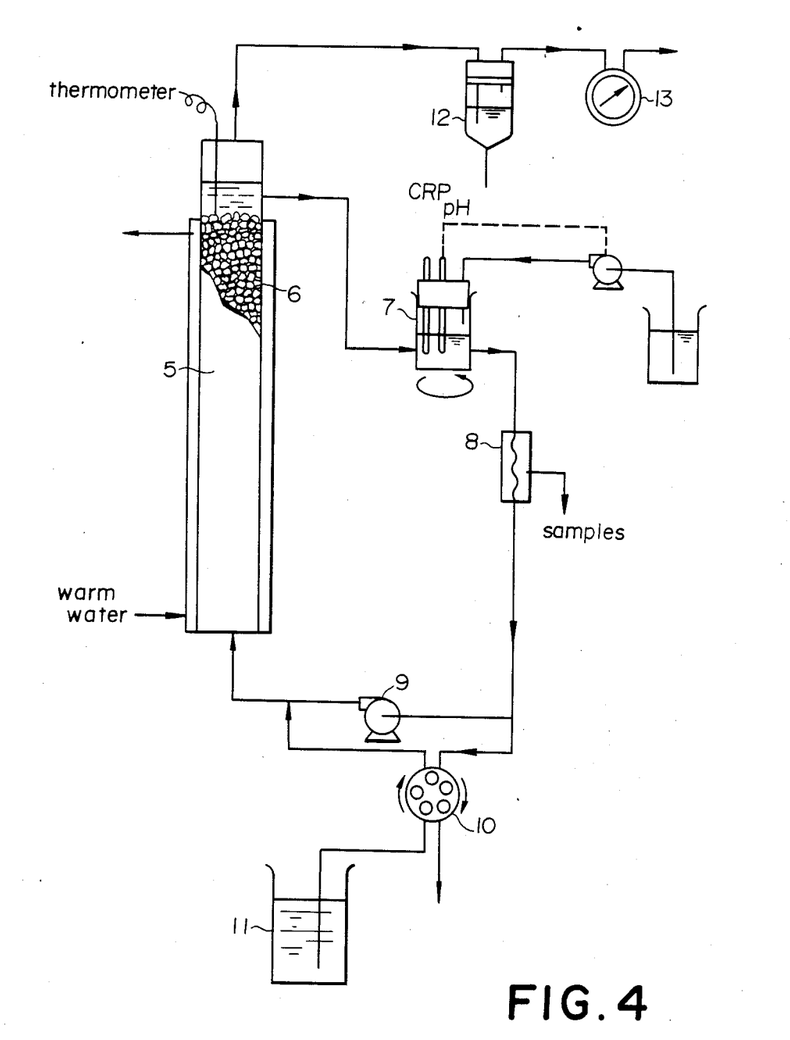
FIG. 4 shows a diagrammatical section of another apparatus used in another embodiment of the invention wherein the methane fermentation is carried out in a continuous mode and FIGS. 5 and 6 are graphs showing, respectively, the volumes of gases generated by the methane fermentation processes conducted by using the apparatus of FIG. 4.

The illustrated apparatus comprises a reaction tower 5 packed with crushed porous fire-resisting stone lumps 6 each having a diameter of 10 to 12 cm, the effective volume of the tower 5 being 1 liter. The effluent from the reactor was subjected to tests for the determination of the pH value and the ORP value oxidation-reduction potential), followed by adjusting the pH value thereof to 7.0 to 7.4, and recirculated by a recirculation pump 9 through an ultrafilter 8 for picking up samples. A portion of the recirculated effluent was picked out of the system by means of a discharge-and-supply pump 10. The raw material liquid, or the evaporator condensate fluid, was supplied into the reactor tower 5 heated to 53° C. from a storage tank 11 by means of the discharge-and-supply pump 10. The amount or volume of the supplied raw material liquid was equalized to that discharged by the same pump 10. The gases emitted from the system was passed from the top of the reactor tower 5 and through a gas seal reservoir 12, and the volume thereof was measured by a gas meter 13.

The composition of the gas was determined by a gas chromatography, and the compositions of the samples picked up from the sample ports and from the raw pulp waste were determined by means of ion-exchange type liquid chromatograms. The pH values of the samples were adjusted by using a 1N-NaOH solution.

Figure 5:
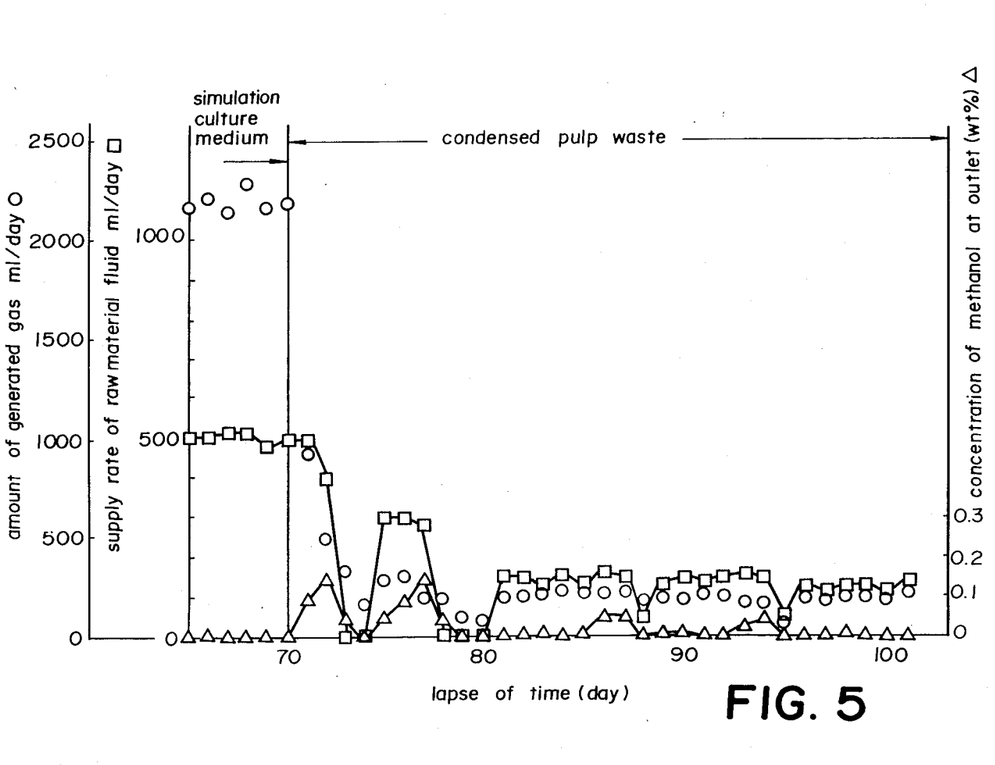
Figure 6:
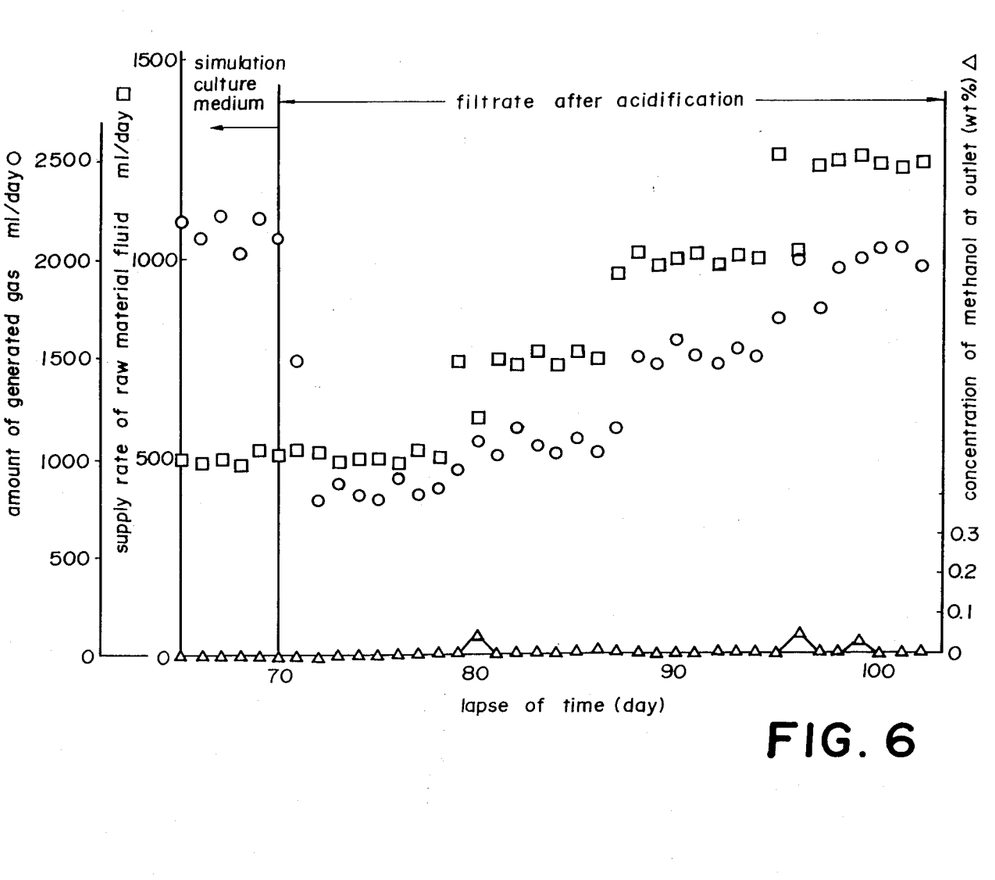

In the experiments conducted while using the aforementioned system, the pulp waste fluid was supplied after the fermentation on the simulation culture medium, and when methanol was detected at the outlet of the reactor tower 5, the raw material supply was stopped and the reaction liquid was recirculated to continue fermentation in a continuous mode (see FIG. 5). The results revealed that the maximum dilution rate for realization of continuous fermentation was a raw material fluid supply rate of about 150 ml/day, namely a dilution rate of about 0.15/day, in case where the pulp waste was directly supplied to the bio-reactor packed with the porous fire-resisting stone. On the other hand, FIG. 6 shows the result of continuous fermentation in terms of the lapse of time in case where the "filtrate after acidification" was supplied similarly to the bio-reactor in which methane fermentation had been conducted continuously. As will be apparent from the result shown in FIG. 6, no substantial methanol was detected at the outlet of the bio-reactor when the "filtrate after acidification" was used as the starting material for methane fermentation, and substantially no methanol was detected in the effluent even if the amount of supplied starting material was increased gradually with the volume of emitted methane gas being increased in proportion to the increase in supplied starting material.

The properties of the effluent liquid obtained by processing the "filtrate after acidification" through the methane fermentation were tested to reveal that the BOD5 was 65 to 140 ppm and the removal ratio of BOD was 97.2 to 95.2%.

Although the porous fire-resisting stone was packed in the bio-reactor in the examples demonstrated hereinbefore, it was used with the aim to further facilitating the methane fermentation of pulp waste since the bacteria participating in methane fermentation were improved in their symbiosis, growth and adherence, and it should be noted that any carrier materials other than porous fire-resisting stone may be used conveniently in the system according to the present invention.

Furthermore, although the invention has been described by referring to presently preferred embodiments thereof, it should be noted hereby that all of the embodiments are illustrated by example only and it is not intended to limit the invention only to such particular embodiments. The invention is, thus, defined by the appended claims.

What is claimed is:

1. A methane fermentation process for processing an evaporator condensate of a waste fluid from a pulp production system, said waste fluid including oily materials, lingin-base materials, and sulfur compounds in an amount of from about 3000 to 8000 ppm, comprising:

(a) the pre-treatment step of adding an acid into said evaporator condensate in an amount sufficient for adjusting the pH value of said evaporate condensate to not higher than pH 3 to settle and coagulate inhibitors for methane fermentation, removing said inhibitors by filtration, and thereafter neutralizing the waste fluid deprived of said inhibitors to obtain a neutralized effluent; and (b) the fermentation step of allowing said effluent from said pre-treatment step to flow through a methane fermentation bio-reactor where said effluent undergoes fermentation to generate methane by contacting said effluent with lumps or particles of crushed porous fire-resisting stone to which methane fermentation bacteria have been adhered.

2. A methane fermentation process as claimed in claim 1, wherein said acid is selected from the group consisting of hydrochloric acid, sulfuric acid nitric acid and formic acid.

* * * * *